(12) United States Patent
Wimmer

(10) Patent No.: US 7,114,476 B1
(45) Date of Patent: Oct. 3, 2006

(54) CARBURETOR INTAKE ASSEMBLY FOR MOTORCYCLES

(76) Inventor: Lee S. Wimmer, 1114 Green St., Perkasie, PA (US) 18944

( * ) Notice: Subject to any disclaimer, the term of this patent is extended or adjusted under 35 U.S.C. 154(b) by 36 days.

(21) Appl. No.: 11/160,492

(22) Filed: Jun. 27, 2005

(51) Int. Cl.
*F02M 35/10* (2006.01)

(52) U.S. Cl. .................... 123/184.21; 123/566

(58) Field of Classification Search ........... 123/184.21, 123/184.32, 566
See application file for complete search history.

(56) References Cited

U.S. PATENT DOCUMENTS

| | | | |
|---|---|---|---|
| 5,307,771 A | 5/1994 | Stahel, II et al. | |
| 5,868,808 A | 2/1999 | Henderson | |
| 5,908,079 A | 6/1999 | Amino | |
| 6,374,815 B1 | 4/2002 | Ness et al. | |
| 6,780,214 B1 | 8/2004 | Leibold | |
| 6,824,583 B1 | 11/2004 | Bulger | |

*Primary Examiner*—Noah P. Kamen
(74) *Attorney, Agent, or Firm*—Gregory J. Gore

(57) ABSTRACT

An air intake assembly for a motorcycle provides increased air flow to the carburetor by increasing the intake area of the ducting and placing it out in the air stream facing forward so that a ram air effect is achieved. Increased intake area is provided by dual velocity stacks arranged in an over-and-under vertical orientation positioned directly adjacent the side of the engine to minimize the width of the motorcycle. A compact aesthetically-pleasing assembly is provided which can also increase performance.

12 Claims, 3 Drawing Sheets

CARBURETOR INTAKE ASSEMBLY FOR MOTORCYCLES

FIELD OF THE INVENTION

The present invention relates to internal combustion engines and in particular to an intake assembly mounted to the fuel mixing device of the engine. More specifically, it relates to an intake assembly for a motorcycle carburetor which produces a ram air effect.

BACKGROUND OF THE INVENTION

Internal combustion engines utilize a fuel mixing device such as a carburetor or a pressurized fuel injection system (hereinafter "carburetor") in order to provide a combustible charge to the engine combustion chambers for ignition. Different intake assemblies have been used on the inlet side of the carburetor to provide a more efficient air flow and therefore increase the amount of charge delivered to the combustion chambers to increase the power output of the engine. One such apparatus is a velocity stack attached to the mouth of the carburetor. A velocity stack is a conical structure convergent in the direction of the carburetor inlet that directs the intake air flow and increases the density of the air mass as it enters the carburetor. Other structures providing the same function which do not have a circular cross-section have also been employed. It is further known to position the intake device so that it directly receives the air stream of the moving vehicle. This further increases engine horsepower by forcing a greater amount of air into the carburetor, and hence the engine, for yet greater power production. It is generally referred to as "ram air effect." This ram air principle has been adopted on motorcycles, however it has not been utilized in an efficient and aesthetically acceptable way for the highly popular Harley Davidson® V-twin motorcycle engine because with this engine layout the carburetor is side-mounted.

U.S. Pat. No. 5,868,808 issued to Henderson discloses a carburetor air intake velocity stack engageable with a carburetor inlet. U.S. Pat. No. 6,780,214 issued to Leibold discloses an air intake scoop for a motorcycle carburetor. The Leibold air intake scoop has 90-degree air flow movement to take in air from the forward direction travel of the motorcycle and send it 90 degrees into the side-mounted mouth of the carburetor. U.S. Pat. No. 5,307,771 issued to Stahel II et al. discloses an intake assembly for delivering air to a motorcycle carburetor which includes a housing mountable on the carburetor that encloses an air filter. The Stahel housing includes forward-facing inlet ports which deliver air to the air filter, however any ram effect is negated by valve assemblies within the ports which prevent the overpressurization of the intake air.

What is needed is means for efficiently providing the ram air effect to a V-twin motorcycle engine carburetor that can increase engine horsepower output while providing an aesthetic appearance to the motorcycle.

SUMMARY OF THE INVENTION

In order to meet the needs in the art described above, the present intake assembly has been devised. The invention provides increased air flow to the carburetor by increasing the area of the ducting leading to the carburetor and placing it out in the air stream facing forward so that a ram air effect is achieved. A great amount of intake area is provided by dual velocity stacks arranged in an over-and-under vertical orientation positioned directly adjacent the side of the engine to minimize the width of the motorcycle. Cone-shaped air filters may be used in conjunction with the velocity stacks and the invention's use of dual intake conduits also maximizes the available surface area for air filtration. The result is a compact, aesthetically pleasing assembly which can enhance engine performance.

According to one aspect of the invention, a motorcycle intake assembly comprises a two-into-one manifold affixed to an intake side of the carburetor. A plate is affixed between the carburetor and the manifold. The manifold joins a single carburetor intake opening at one end to two conduits at the other end. Two separate elongate tubular conduits extend from the manifold and at that point of origin have axes laterally disposed with respect to a longitudinal center line of the motorcycle. Each of the conduits includes at least one 90-degree bend such that inlet ports of each of the conduits face in a forward direction with respect to the motorcycle and are aligned parallel to the longitudinal center line of the motorcycle. The outlet ports of the conduits which align with the manifold lie in a horizontal plane while the conduit inlet ports lie in a vertical plane. The placement of the conduit inlets may be longitudinally staggered or offset, providing a fore conduit and an aft conduit with respect to the operating direction of the motorcycle. The fore conduit includes a single 90-degree bend which lies in a horizontal plane and the aft conduit includes a first 90-degree bend in a first vertical plane and a second 90-degree bend in a second vertical plane. The inlet port of the fore conduit lies above the inlet port of the aft conduit and the cross-section of each conduit is circular. At least one inlet port of one of the conduits further includes a conical velocity stack that may also include air filtration means.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

DESCRIPTION OF THE PREFERRED EMBODIMENT

Figure 1:
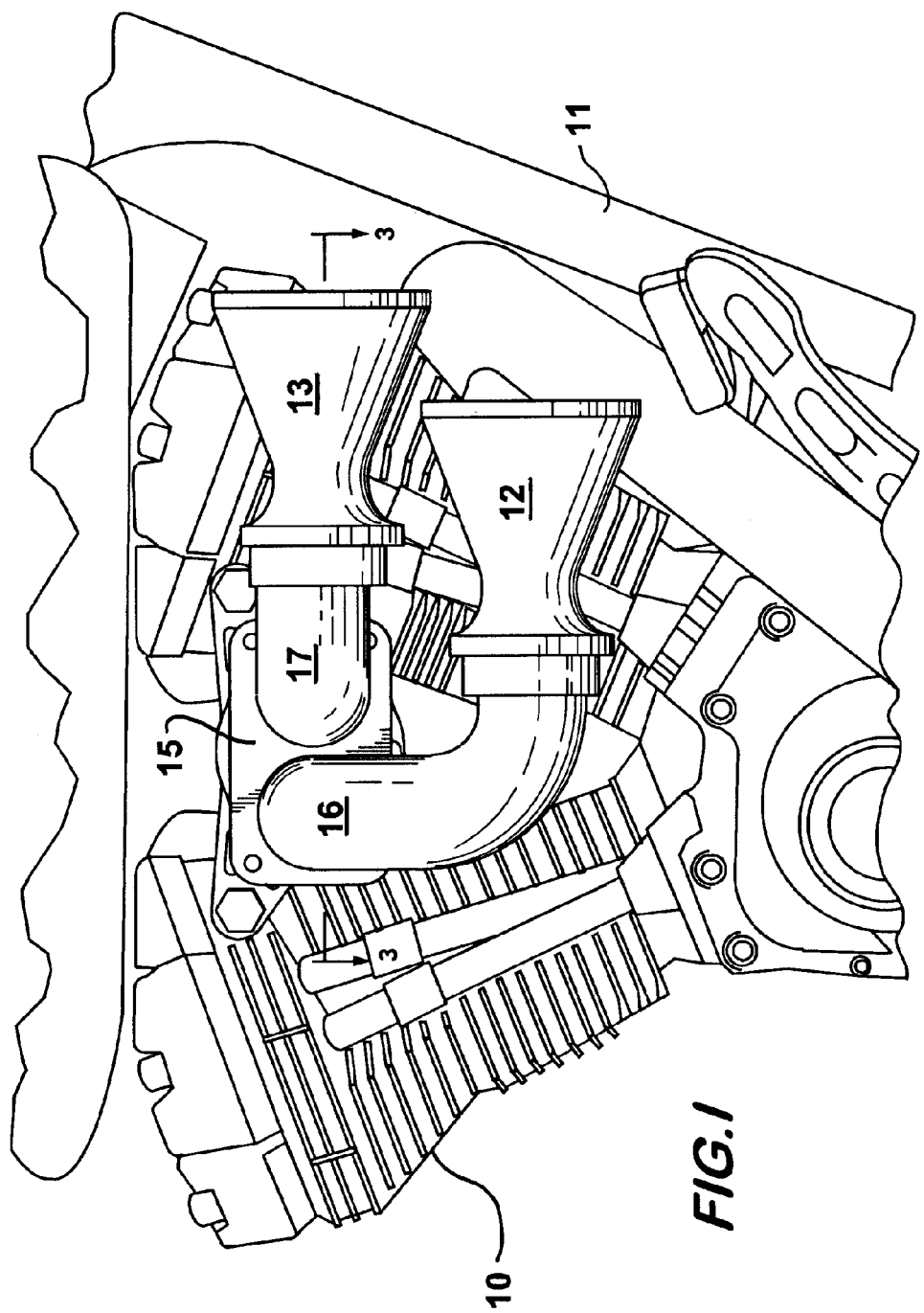
FIG. 1 is a left side elevation view of the invention mounted to a motorcycle engine.

Referring now to FIG. 1, the intake assembly of the present invention is affixed to the intake side of an engine-mounted carburetor. The intake assembly is shown installed on a V-twin type motorcycle engine 10 which is mounted in motorcycle frame 11 with the conical velocity stacks 12 and 13 facing in the forward direction. The intake assembly includes a manifold 15 which expands the intake area of a single carburetor inlet opening into an enlarged inlet tract that is aligned and in fluid communication with individual conduits 16 and 17. Conduit 17 is disposed more forwardly than conduit 16 and will be herein referred to as the "fore" conduit and similarly conduit 16 will be referred to as the "aft" conduit. The inlet end of each conduit may include a velocity stack and as shown in this figure, the velocity stacks are located one above the other and both are located directly adjacent one side of the motorcycle engine. Each of the conduits 16 and 17 extend laterally from the motorcycle engine originating side-by-side in the horizontal plane.

Figure 2:
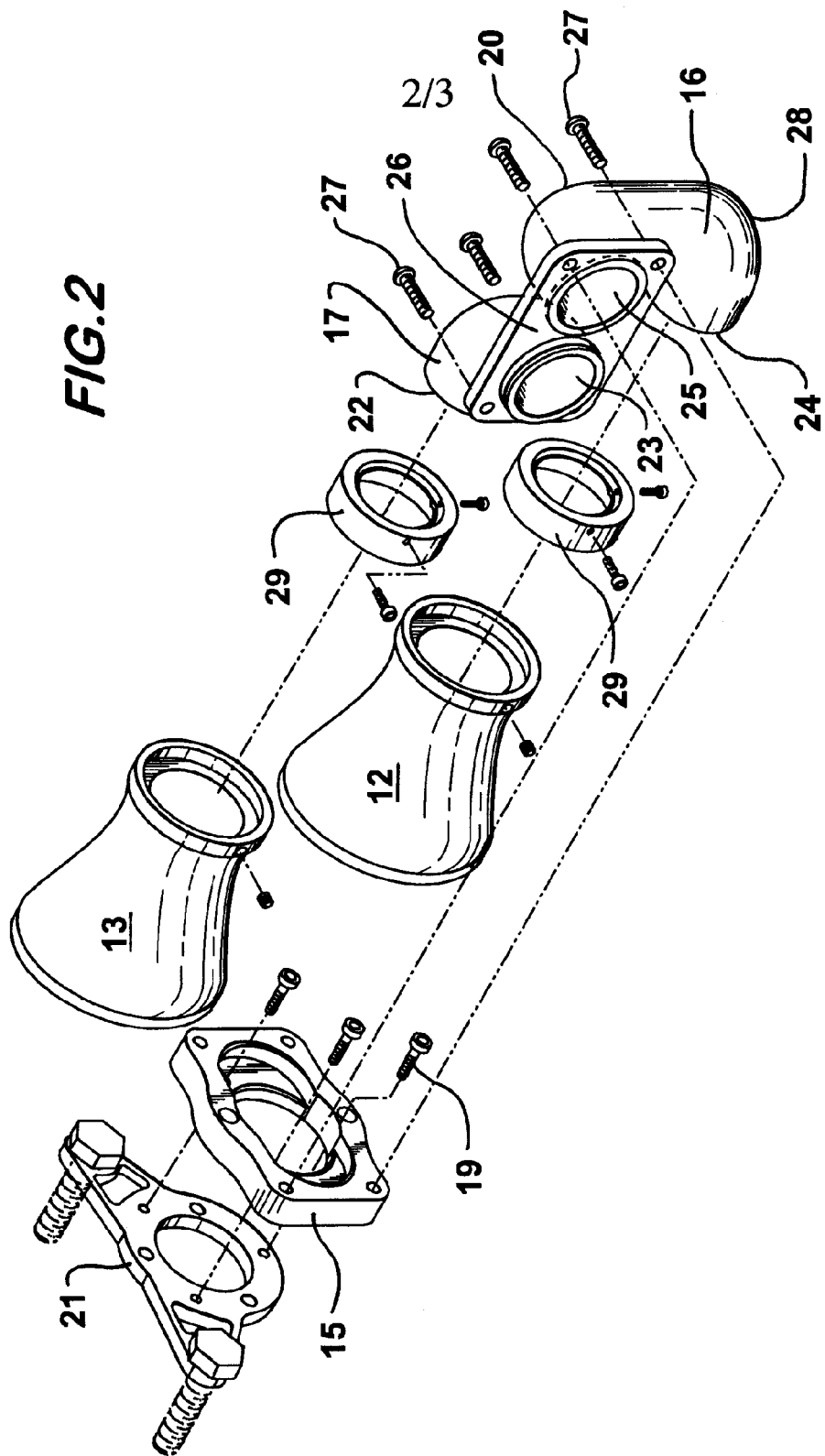
FIG. 2 is a perspective assembly view of the invention.

Referring now to FIG. 2, this assembly view shows the various components of the invention and the means by which they are mechanically joined. A carburetor plate 21 is affixed to the motorcycle engine carburetor and a manifold 15 is affixed to the carburetor plate by screws 19. The manifold 15 has an enlarged intake opening for receiving air flow from outlet ports 23 and 25 of the fore and aft intake conduits respectively. Screws 27 mount the conduits to the manifold by way of flange 26 to which the conduits are rigidly affixed. In this embodiment, velocity stacks 12 and 13 are affixed to the inlet ports 22 and 24 of the fore and aft conduits by way of collars 29 and their associated set screws. The aft conduit includes a first 90-degree bend 20 in a first vertical plane and a second 90-degree bend 28 in a second vertical plane which is perpendicular to the first plane.

Figure 3:
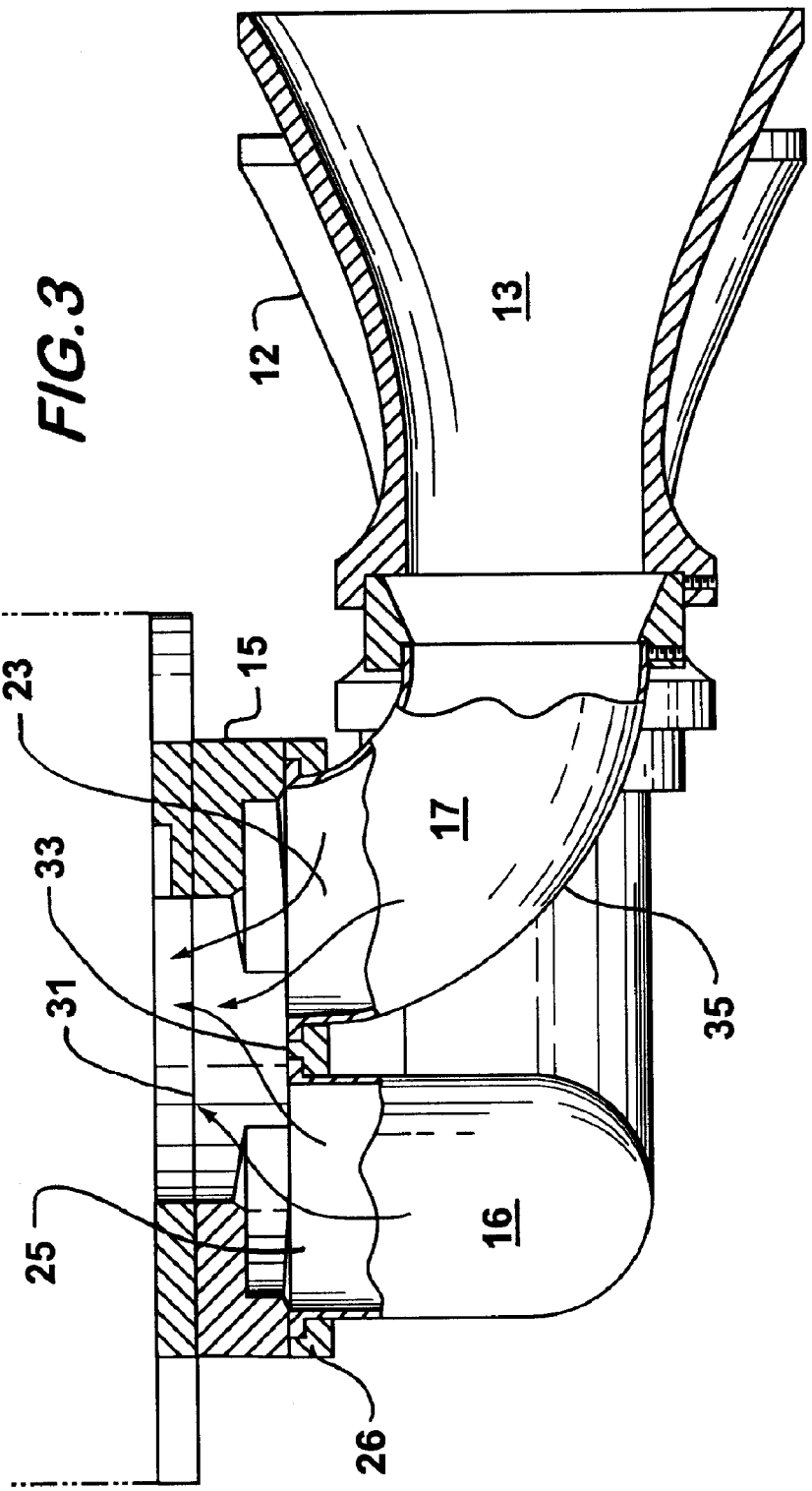
FIG. 3 is a partially sectioned plan view.

Referring now to FIG. 3, conduits 16 and 17 are joined to manifold 15 by way of flange 26. The manifold includes a cavity which joins a smaller opening 31 at one end with an enlarged opening 33 at the opposite end so that outlet ports 23 and 25 of the conduits are in full fluid communication with the manifold 15. The air flow is depicted by the arrows in this figure. As also seen in this figure, the inlets of the conduits and the attached velocity stacks 12 and 13 are positioned one directly above the other in the vertical plane. The fore conduit 17 includes a single 90-degree bend 35 in the horizontal plane.

It should be understood that there may be other modifications and changes to the present invention that will be obvious to those of skill in the art from the foregoing description, however, the present invention should be limited only by the following claims and their legal equivalents.

What is claimed is:

1. A motorcycle intake assembly, comprising:
    a two-into-one manifold affixed to an intake side of a carburetor on the motorcycle engine, said manifold joining a single carburetor intake opening at one end to two conduits at the other end, all being laterally disposed with respect to a longitudinal center line of said motorcycle; and
    two separate conduits each extending from said manifold, each of said conduits including at least one 90-degree bend such that an inlet port of each of said conduits faces in a forward direction with respect to said motorcycle.

2. The intake assembly of claim 1 wherein said conduits include inlet ports which lie in a vertical plane.

3. The intake assembly of claim 2 wherein said conduits are longitudinally offset, one fore and one aft with respect to the direction of the motorcycle.

4. The intake assembly of claim 3 wherein at least one inlet port of one of said conduits further includes a conical velocity stack affixed thereto.

5. The intake assembly of claim 3 wherein said conduits extend from said manifold in the horizontal plane.

6. The intake assembly of claim 3 further described in that the fore conduit includes a single 90-degree bend which lies in a horizontal plane and the aft conduit includes a first 90-degree bend in a first vertical plane and a second 90-degree bend in a second vertical plane.

7. The intake assembly of claim 6 wherein an inlet port of said fore conduit lies above an inlet port of said aft conduit.

8. The intake assembly of claim 1 further including a plate affixed between said carburetor and said manifold.

9. The intake assembly of claim 1 wherein a cross-section of each conduit is circular.

10. The intake assembly of claim 1 wherein the conduit inlet ports are parallel to said longitudinal center line.

11. The intake assembly of claim 1 wherein said conduits are elongate and tubular.

12. The intake assembly of claim 11 wherein said conduits have a circular cross-section throughout their entire lengths.

* * * * *